United States Patent [19]

Mutz et al.

[11] Patent Number: 5,653,550
[45] Date of Patent: Aug. 5, 1997

[54] RETAINING DEVICE FOR FASTENING AN APPLIANCE INSERT IN A BASE PANEL

[75] Inventors: Bernd Mutz, Schopfheim; Gerd Rüttnauer, Schwörstadt, both of Germany

[73] Assignee: A. Raymond GmbH & Co. KG, Lorrach, Germany

[21] Appl. No.: 553,771

[22] Filed: Oct. 23, 1995

[30] Foreign Application Priority Data

Oct. 21, 1994 [DE] Germany ............ 44 37 630.8

[51] Int. Cl.⁶ ............................................ F16B 2/24
[52] U.S. Cl. ............... 403/329; 403/397; 403/407.1; 4/633
[58] Field of Search .......................... 403/329, 326, 403/384, 397, 405.1, 406.1, 407.1, 408.1; 24/563, 545; 245/222.11, 221.11, 500, 27.3; 4/631, 632, 633, 634, 635, 636

[56] References Cited

U.S. PATENT DOCUMENTS

| | | | |
|---|---|---|---|
| 2,459,953 | 1/1949 | Mills | 403/408.1 X |
| 2,885,691 | 5/1959 | Juergens | 4/633 X |
| 3,022,519 | 2/1962 | Lang | 4/633 |
| 3,143,743 | 8/1964 | Just | 4/633 |
| 3,196,466 | 7/1965 | Di Lorenzo | 4/633 X |
| 3,210,776 | 10/1965 | Cox | 4/633 |
| 3,229,310 | 1/1966 | Enscy | 4/636 |
| 3,680,152 | 8/1972 | Farrell | 4/633 |
| 4,504,986 | 3/1985 | Vigh | 4/633 |
| 4,547,951 | 10/1985 | Van Der Kooij | 4/635 X |

FOREIGN PATENT DOCUMENTS 30 40 180  5/1982  Germany.

*Primary Examiner*—Harry C. Kim
*Attorney, Agent, or Firm*—Finnegan, Henderson, Farabow, Garrett & Dunner

[57] ABSTRACT

A retaining device for fastening an appliance insert in a base panel, such as a sink in a kitchen work surface. The device has a retaining clamp that can be fixed in an opening in the work surface, and a retaining web connected to the sink that can be introduced into the retaining clamp from above and anchored in place. The retaining clamp includes an elongated retaining leg and two elastically resilient clamping legs integrally formed, in a U-shaped manner, on the ends of the retaining leg. The retaining leg can be firmly fixed in a predetermined position on the side edges of the opening while the clamping legs have latching teeth oriented towards the retaining leg and into which the retaining web can be latched, by a latching web directed towards the latching teeth, after being pressed into the retaining clamp.

6 Claims, 2 Drawing Sheets

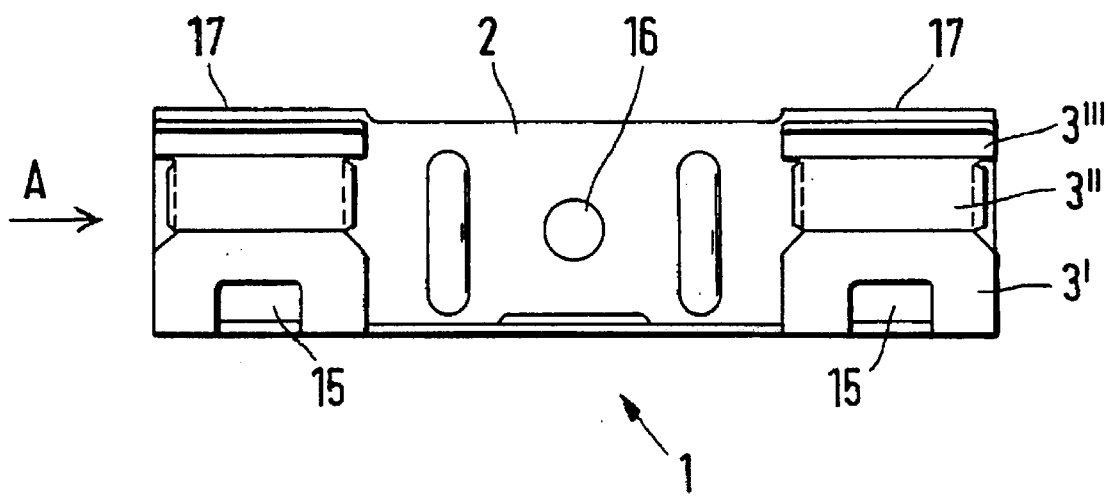
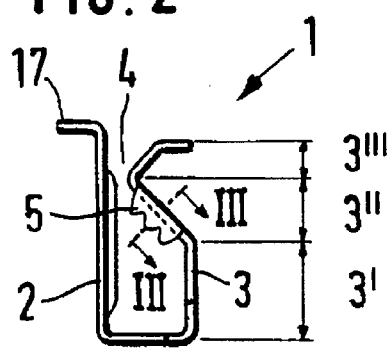
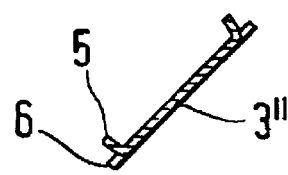
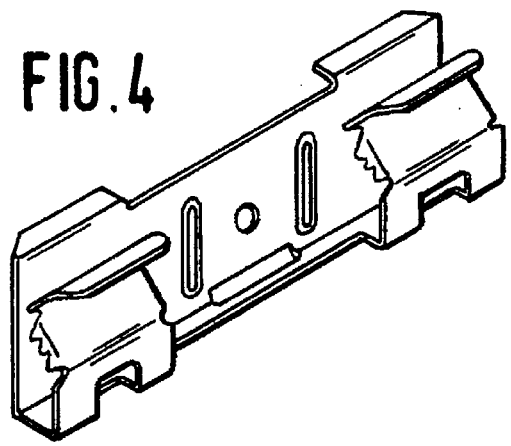

RETAINING DEVICE FOR FASTENING AN APPLIANCE INSERT IN A BASE PANEL

BACKGROUND OF THE INVENTION

This invention relates to a retaining device for fastening an appliance insert in a base panel; for example, a sink in a kitchen work surface.

Fastening devices of this type are known from DE 30 40 180 A1. The fastening device shown in this patent includes a retaining clamp that can be fixed on the work surface, and a retaining web, which extends at an angle from the appliance insert, that can be introduced into the retaining clamp and anchored therein in various latching steps.

The retaining clamp is bent in an angular shape and has two slots on one leg and is pushed onto a retaining strip, by means of the slotted leg, from the underside of the work surface, while the other leg is supported on the border of an opening in the work-surface dimensioned to receive the insert. The retaining strip, for its part, is firmly connected to the retaining web and has on one side latching grooves into which the slotted leg of the retaining clamp latches, by means of a clamping lug integrally formed on the upper border of said leg, when the retaining clamp is pressed on.

In the case of this fastening device, it is disadvantageous that the retaining clamp has to be pressed onto the retaining web from beneath, or onto the retaining strip fastened thereon. This means that, during installation of the kitchen sink into an existing work surface, the installer, lying beneath the sink, has to press the retaining clamps "overhead" onto the retaining strips. If there is later a need to remove the sink, then the retaining strips have to be separated, or at least loosened, from the retaining webs in an extremely laborious manner from beneath and the clamping legs pressed inwards.

An object of the present invention therefore is to provide a retaining clamp which can be inserted without difficulty into the work-surface opening from above, can be easily connected to the retaining web of the sink and, if required, can also be easily released.

SUMMARY OF THE INVENTION

This object is achieved according to the present invention by providing a retaining device for fastening an appliance insert in an opening in a base panel, said device comprising a retaining clamp having a retaining leg adapted to be fixed in a pre-determined position on an edge of the opening and a resilient clamping leg connected to the retaining leg in a U-shaped manner and forming a space between the legs, said clamping leg having latching teeth that extend toward the retaining leg of the clamp, and a retaining web adapted to be fixed to and extend at an angle from the appliance insert, said retaining web having a latching web formed thereon, whereby when the retaining web on the appliance insert is pressed into the space between the two legs of the retaining clamp, the latching web engages with the latching teeth on the clamping leg of the retaining clamp and anchors the insert in place in the opening in the panel.

BRIEF DESCRIPTION OF THE DRAWINGS

An exemplary embodiment of the invention is described in more detail below and shown in the drawings, in which:

FIG. 1 is a front view of the retaining clamp of the invention;

FIG. 2 is a side view taken in the direction of arrow "A" in FIG. 1;

FIG. 3 is a sectional view taken along the line III—III in FIG. 2 through the clamping leg in the region of the latching teeth;

FIG. 4 is a perspective view of the retaining clamp;

FIG. 6 shows the same installation situation, after the retaining web has been pressed in.

DETAILED DESCRIPTION OF THE INVENTION

Figure 5:
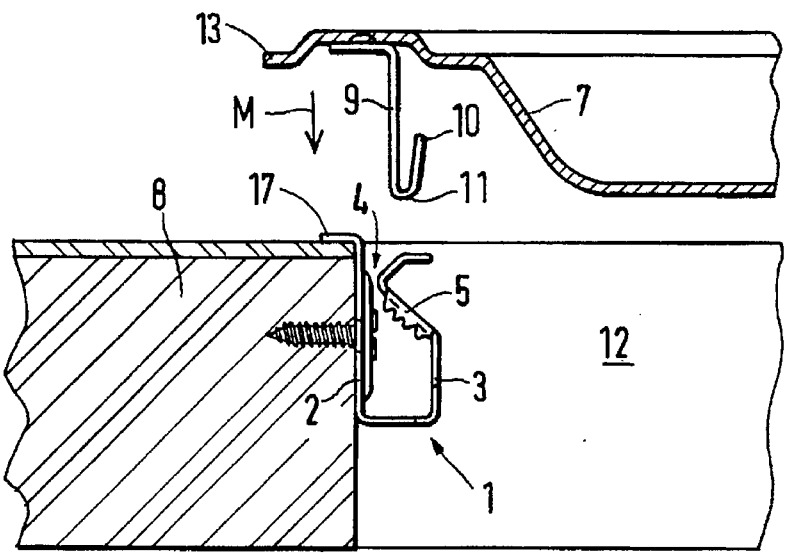
FIG. 5 shows a sink before a retaining web attached to the sink is pressed into the latching region of an installed retaining clamp.
Figure 6:
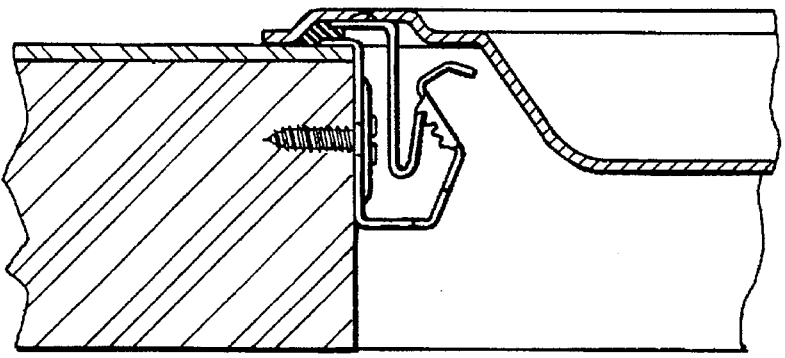
Figure 7:
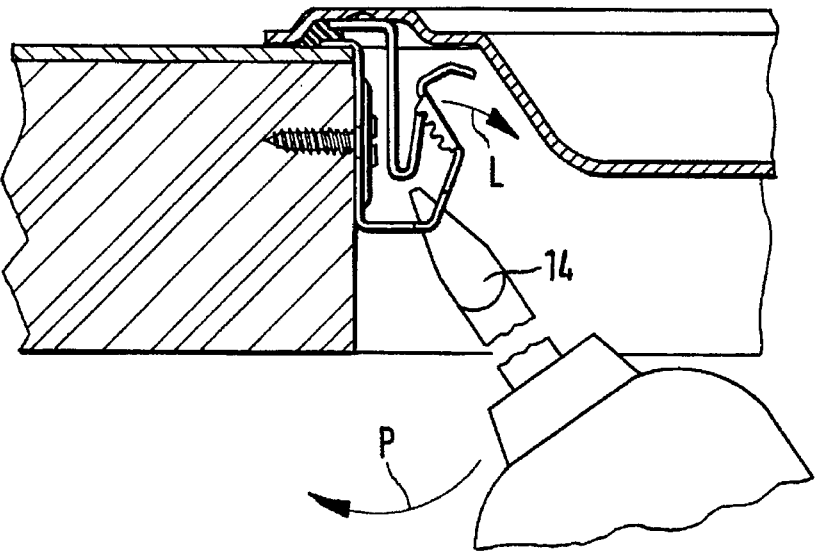
FIG. 7 shows the same installation situation, as the retaining clamp is being bent open.

The retaining clamp 1 shown in the drawing serves for fastening an appliance insert in a base panel and, in particular, for fastening a sink 7 in an opening 12 in a kitchen work surface 8 (see FIGS. 5–7).

With reference to FIGS. 1–4, retaining clamp 1 includes an elongated retaining leg 2 and two clamping legs 3 which are integrally formed on, in a U-shaped manner, at the opposite ends of the retaining leg. Retaining leg 2 is intended to be fixedly bonded or fastened in a predetermined position on the border or side edges of opening 12 in work surface 8 such as by a screw passing through a fastening hole 16 in the clamp. To properly position the clamp, a web 17 bends off at right angles from the upper portion of the retaining leg 2, which web 17 is supported by the upper edge of the work surface 8 when retaining clamp 1 is fitted in place (see FIG. 5).

Each clamping leg 3 is divided into three regions: a lower resilient region 3', a central latching region 3" and an upper introduction region 3'". Lower resilient region 3' extends approximately parallel to retaining leg 2. Central latching region 3" is directed obliquely upwards and towards retaining leg 2 and forms at its upper end with retaining leg 2, an open gap or constriction 4. This upper end adjoins introduction region 3'" which extends obliquely away from retaining leg 2.

In its central region 3", clamping leg 3 has latching teeth 5 that are oriented towards retaining leg 2. As can be seen from FIG. 3, the latching teeth 5 are formed out of the lateral side edges 6 of clamping leg 3 and are angled off towards retaining leg 2 by at least the depth of the teeth.

A sink 7, which is to be fastened in the work surface 8, has fixed on its underside a plurality of retaining webs 9 that extend vertically downward from the sink and are bent over at their lower ends 11 forming an upwardly directed latching web 10. These latching webs 10 interact with the latching teeth 5 of the clamping leg 3 in the manner shown in FIG. 6.

When a sink 7 is lowered onto the work surface 8 and into opening 12 in the surface in the direction of the arrow "M" (FIG. 5), the retaining webs 9 first of all make contact, by means of their bent-over ends 11, with the introduction region 3'" of a clamping leg 3 which extends obliquely away from the retaining leg 2 as a result of which leg 3 opens resiliently toward the interior of the opening 12. After bent-over end 11 passes constriction 4 between introduction region 3" and latching region 3", the clamping leg moves resiliently back again.

Latching teeth 5 are arranged such that latching web 10 on the retaining web 9 latches in beneath one of the latching teeth 5 when the borders or flanges 13 of sink 7 rest firmly on the work surface 8 (FIG. 6). This takes place simultaneously at a number of locations around the opening 12, with the result that the sink 7 is firmly connected to the work surface 8 from above simply by pressing down on it.

If there is a need to remove sink 7, this can be accomplished simply by bending clamping legs 3, as is shown in FIG. 7, towards the sink in the direction of the arrow "L" until the latching teeth 5 release the latching webs 10 upwards. For this purpose, an opening 15 is provided in each case in the lower region 3' of the clamping legs 3, it thereby being possible to introduce an auxiliary tool 14 into an opening 15 to bend the clamping leg 3 open by pressing the tool in the direction of arrow "P".

We claim:

1. A combination comprising a flanged appliance insert, a base panel having an opening therein with a surface surrounding the opening and at least one retaining device for securely fastening the appliance insert in the opening in the base panel with the flange of the appliance insert resting on the surface, said retaining device comprising a retaining clamp having a retaining leg adapted to be fixed in a pre-determined position on an edge of said opening and a resilient clamping leg connected to the retaining leg in a U-shaped manner and forming a space between the legs, said clamping leg having latching teeth that extend toward the retaining leg of the clamp, and a retaining web fixed at one end to and extending downwardly from the appliance insert adjacent to the flange thereof, said retaining web having a latching web formed on an opposite end thereof, whereby when the retaining web on the appliance insert is pressed into the space between the two legs of the retaining clamp, the latching web of the retaining web engages with the latching teeth on the clamping leg of the retaining clamp and anchors the appliance insert in place in the opening in the panel.

2. The combination of claim 1, wherein the retaining web is bent over at a lower end thereof to form an upwardly directed latching web, a free end of the latching web engaging with the latching teeth on the clamping leg of the retaining clamp.

3. The combination of claim 1 wherein, in the region of the latching teeth, the clamping leg of the retaining clamp extends obliquely towards an upper end of the retaining leg and then above the latching teeth, outwardly and obliquely away from the retaining leg to form a constriction in the space between said two legs for receiving said retaining web, whereby as the retaining web is pressed into the constriction, the clamping leg is pushed away from the retaining leg and then resiliently engages the latching teeth on the clamping leg with the latching web of the retaining web.

4. The combination of claim 1, wherein the clamping leg has parallel extending, outer lateral side edges and the latching teeth are formed out of the outer lateral side edges of the clamping leg, the teeth extending at an angle towards the retaining leg by at least the depth of the latching teeth.

5. The combination of claim 1, wherein, in the region beneath the latching teeth, the clamping leg has an opening for receipt of a tool for resiliently pulling the clamping leg away from the retaining leg to release the retaining web from the retaining clamp.

6. The combination of claim 1, wherein the retaining device comprises two of said retaining webs spaced apart and fixed to and extending downwardly from the appliance insert adjacent to said flange thereof and the retaining clamp comprises an elongated retaining leg adapted to be fixed in a pre-determined position on the edge of said opening and two resilient clamping legs spaced apart the same distance as said retaining webs and integrally connected to, the elongated retaining leg at opposite ends thereof in the U-shaped manner, each said clamping legs having the latching teeth and forming the space between an upper end thereof and the elongated retaining leg for receipt of one of said retaining webs.

* * * * *